(12) United States Patent
Anshel et al.

(10) Patent No.: US 6,493,449 B2
(45) Date of Patent: Dec. 10, 2002

(54) METHOD AND APPARATUS FOR CRYPTOGRAPHICALLY SECURE ALGEBRAIC KEY ESTABLISHMENT PROTOCOLS BASED ON MONOIDS

(75) Inventors: Iris Anshel, Tenafly, NJ (US); Michael M. Anshel, New York, NY (US); Dorian Goldfeld, Tenafly, NJ (US)

(73) Assignee: Arithmetica, Inc., Wilmington, DE (US)

( * ) Notice: Subject to any disclaimer, the term of this patent is extended or adjusted under 35 U.S.C. 154(b) by 0 days.

(21) Appl. No.: 09/030,935

(22) Filed: Feb. 26, 1998

(65) Prior Publication Data

US 2002/0001382 A1 Jan. 3, 2002

(51) Int. Cl.$^7$ ................................. H04L 9/30
(52) U.S. Cl. ..................... 380/30; 380/28; 380/285
(58) Field of Search ..................... 380/21, 25, 28, 380/30, 285

(56) References Cited

U.S. PATENT DOCUMENTS

| | | | |
|---|---|---|---|
| 4,078,152 A | | 3/1978 | Tuckerman |
| 4,195,200 A | | 3/1980 | Feistel |
| 4,405,829 A | | 9/1983 | Rivest et al. ............... 178/22.1 |
| 5,237,615 A | | 8/1993 | Snow ........................... 380/47 |
| 5,515,307 A | * | 5/1996 | Aiello et al. ................. 364/717 |
| 5,627,893 A | | 5/1997 | Demytko ..................... 380/30 |
| 5,812,072 A | * | 9/1998 | Masters ........................ 341/55 |
| 5,889,865 A | * | 3/1999 | Vanstone et al. ............. 380/25 |
| 5,966,444 A | * | 10/1999 | Yuan et al. .................... 380/21 |

FOREIGN PATENT DOCUMENTS

| | | | | |
|---|---|---|---|---|
| EP | WO-9534135 | * | 12/1995 | ............ H03M/7/30 |
| WO | WO 95/34135 | * | 12/1995 | |

OTHER PUBLICATIONS

Siromoney et. al. Public Key Cryptosystems Based on Word Problem, Proceedings of the ICOMIDC—Symposium on Mathematic of Computation, Apr. 25–29, 1988.*
Bruce Schneier, Applied Cryptography 2e, John Wiley pp. 1–3, 513–518, Oct. 1995.*
Wagner, A Public-key cryptosystem Based on the Word Problem, Crypto 84.*
Patterson, Mathematical Cryptology for scientist and Mathematicians, Rowman & Littlefield.*
Schneier, Applied Cryptology, John Wiley, 1995.*
International Search Report for PCT/US99/04126, mailed Aug. 17, 1998.
Blum L. et al. "A Simple Unpredictable Psuedo–Random Number Generator" Siam Journal on Computing, vol. 15, No. 2, May 1986, pp. 364–383, XP002037919.
Written Opinion for PCT/US99/04126, mailed Feb. 18, 2000.

(List continued on next page.)

Primary Examiner—Gail Hayes
Assistant Examiner—James Seal
(74) Attorney, Agent, or Firm—Fulbright & Jaworski L.L.P.

(57) ABSTRACT

The present invention is a method and apparatus for providing cryptographically secure algebraic key establishment protocols that use monoids and groups possessing certain algorithmic properties. Special fast algorithms associated with certain monoids and groups are used to optimize both key agreement and key transport protocols. The cryptographic security of the algorithms is based on the difficulty of solving the conjugacy problem in groups and other known hard algebraic problems. Braid groups and their associated algorithms are the basis for highly rapid key agreement and key transport protocols which employ modest computational resources.

33 Claims, 12 Drawing Sheets

OTHER PUBLICATIONS

Wayne Patterson, Mathematical Cryptology for Computer Scientists and Mathematicians, Rowman & Littefield, 1987, pp. 109–114.

Colin Adams, An Elementary Introduction to the Matematical Theory of Knots, Freeman, 1994.

Neal Wagner, et. al., A Public–Key Cryptosystem Based on the Word Problem, Crypto 84, 1985, 19–36.

P. Cohn, an Algerbraist Looks at Coding Theory, Bulletin of the Institute of Mathematics and Its Applications, 1989. (abstract).

G. Hofer, Automata Applied to Information Theory, Methods of Operation Research, 64, 1990, p. 463, 465 and 472.

Bruce Schneier, Applied Cryptography, 2e, John Wiley, 1996, 169–187, 420–428, fig 9–6.

Alfred Menezes, Paul Oorschot, and Scott, vanstone, Handbook of Applied Crytography, CRC Press, 1997, Chapter 12.

Diffie et. al., New Directions in Crytography, IEEE Transaction on Information Theory, vol. 22, No. 6. Nov. 1976.

* cited by examiner

METHOD AND APPARATUS FOR CRYPTOGRAPHICALLY SECURE ALGEBRAIC KEY ESTABLISHMENT PROTOCOLS BASED ON MONOIDS

BACKGROUND OF THE INVENTION

1. Field of the Invention

The invention relates to algebraic key establishment protocols for cryptographic applications.

2. Description of the Prior Art

Key Establishment Protocols

The concepts, terminology and framework for understanding cryptographic key establishment protocols is given in Alfred J. Menezes, Paul C. van Oorschot, and Scott A. Vanstone, "Handbook of Applied Cryptography," CRC Press (1997), pages 490–491.

A 'protocol' is a multi-party algorithm, defined by a sequence of steps specifying the actions required of two or more parties in order to achieve a specified objective.

A 'key establishment' protocol is a protocol whereby a shared secret becomes available to two or more parties, for subsequent cryptographic applications.

A 'key transport' protocol is a key establishment protocol where one party creates or obtains a secret value, and securely transfers it to the other participating parties.

A 'key agreement' protocol is a key establishment protocol in which a shared secret is derived by two (or more) parties as a function of information contributed by, or associated with, each of the participating parties such that no party can predetermine the resulting value.

A 'key-distribution' protocol is a key establishment protocol whereby the established keys are completely determined a priori by initial keying material.

A 'dynamic' key establishment protocol is one whereby the key established by a fixed pair (or subset) of the participating parties varies on subsequent executions. Dynamic key establishment protocols are also referred to as 'session' key establishment protocols, and it is usually intended that these protocols are immune from known-key attacks.

The Diffie-Hellman key agreement protocol (also called 'exponential key exchange') is a fundamental algebraic protocol. It is presented in W. Diffie and M. E. Hellman, "New Directions in Cryptography," IEEE Transaction on Information Theory vol. IT 22 (November 1976), pp. 644–654. The Diffie-Hellman key agreement protocol provided the first practical solution to the key distribution problem, allowing two parties, never having met in advance or sharing keying material, to establish a shared secret by exchanging messages over an open channel. The security rests on the intractability of the Diffie-Hellman problem and the related problem of computing discrete logarithms in the multiplicative group of the finite field GF(p) where p is a large prime, cf. Alfred J. Menezes, Paul C. van Oorschot, and Scott A. Vanstone, "Handbook of Applied Cryptography," CRC Press (1997), page 113.

A key establishment protocol is said to have 'perfect forward secrecy' if compromise of long-term keys does not compromise past session keys. The idea of perfect forward security is that previous traffic is locked safely in the past. It may be provided by generating session keys by Diffie-Hellman key agreement, wherein the Diffie-Hellman exponentials are based on short term keys. If long-term secret keys are compromised, future sessions are nonetheless subject to impersonation by an active adversary (cf. Alfred J. Menezes, Paul C. van Oorschot, and Scott A. Vanstone, "Handbook of Applied Cryptography," CRC Press (1997), page 496).

'Point-to-point key update' techniques based on symmetric encryption would make use of a long-term symmetric key K shared a priori by two parties A and B. The Diffie-Hellman key agreement protocol allows for the establishment of such a K. Thus, the Diffie-Hellman key agreement protocol together with the symmetric encryption system provide the primitives in specifying a key transport protocol (cf. Alfred J. Menezes, Paul C. van Oorschot, and Scott A. Vanstone, "Handbook of Applied Cryptography," CRC Press (1997), page 497).

Combinatorial Group Theory

The definition of a monoid is given in Serge Lang, "Algebra," Third Edition, Addison-Wesley Publishing Company Inc. (1993), page 3.

Quote

Let S be a set. A mapping S×S→S is sometimes called a law of composition (of S into itself). If x, y are elements of S, the image of the pair (x, y) under the mapping is also called their product under the law of composition, and will be denoted xy . . . . Let S be a set with a law of composition. If x, y, z are elements of S, then we may form their product in two ways: (xy)z and x(yz). If (xy)z=x(yz) for all x, y, z in S then we say that the law of composition is associative.

An element e of S such that ex=x=xe for all x ∈ S is called a unit element.

A unit element is unique, for if e' is another unit element, we have e=ee'=e' by assumption. In most cases, the unit element is written simply 1 (instead of e) . . . .

A monoid is a set G, with a law of composition which is associative, and having a unit element (so that in particular, G is not empty).

Unquote

The definition of a group is given in Serge Lang, "Algebra," Third Edition, Addison-Wesley Publishing Company Inc. (1993), page 7.

Quote

A group G is a monoid, such that for every element x ∈ G there exists an element y ∈ G such that xy=yx=e. Such an element y is called an inverse for x. Such an inverse is unique. . . We denote this inverse by $x^{-1}$.

Unquote

The basic reference for concepts, terminology, and historical framework in combinatorial group theory is the monograph by Bruce Chandler and Wilhelm Magnus, "The history of combinatorial group theory: a case study in the history of ideas," Springer-Verlag (1982). We quote from page 3:

Quote

Combinatorial group theory may be characterized as the theory of groups which are given by generators and defining relations, or, as we would say today, by a presentation.

Unquote

The following problems were posed by M. Dehn in 1911. We quote from the monograph by Bruce Chandler and Wilhelm Magnus, "The history of combinatorial group theory: a case study in the history of ideas," Springer-Verlag (1982), page 19.

Quote

The Word Problem (called Identitaetsproblem by Dehn) Let an arbitrary element of the group be given through its buildup in terms of the generators. Find a method to decide in a finite number of steps whether this element equals the identity element or not.

The Conjugacy Problem (called Transformationsproblem by Dehn) Any two elements S and T of the group are given. Find a method to decide whether S and T are conjugate, i.e. whether there exists an element U of the group which satisfies the relation $S=UTU^{-1}$.
Unquote The comparison form of the word problem can be stated as follows:

Comparison Form of the Word Problem Let u, v be any two elements of the group given. Find a method to decide in a finite number of steps whether u=v.

Assume that G is a group given by a presentation P(G). Let W(G) denote the set of all words in the generators and their inverses given in the presentation of G. The functional form of the word problem is to produce a mapping F from W(G) to W(G) such that for all u, v ∈ W(G) it follows that F(u)=F(v) if and only if u, v define the same element of G with respect to the presentation P(G). For each element u ∈ W(G) the element F(u) is termed the canonical form of u.

The functional form of the word problem requires an algorithm to produce canonical forms.

The Canonical Form Problem Let u be an arbitrary element of the given group. Specify a method to find, in a finite number of steps, a canonical form for u.

The functional form of the conjugacy problem requires, in addition, an algorithm to actually produce the conjugating element U.

Generalized Conjugacy Problem (functional form) Let $S_1$, $S_2$, . . . , $S_n$ be elements of a group G. Assume that a ∈G is secret and the set of n pairs of elements of the group G $$\{s_1, a^{-1}s_1 a\}, \{s_2, a^{-1}s_2 a\}, \ldots \{s_n, a^{-1}s_n a\}$$

are publicly announced. Find an algorithm to actually produce such an element a.

It is self evident that this problem is harder than the original conjugacy problem. It has been known for some time that there exist groups with solvable word problem and unsolvable conjugacy problem. For example, in D. J. Collins and C. F. Miller III, "The conjugacy problem and subgroups of finite index," Proc. LMS Series 3, 34, (1977), p. 535–556) it is shown that there exist finitely presented groups G with solvable word problem which contain a subgroup H of index 2 with an unsolvable conjugacy problem. (Of course, the word problem for H is solvable.)

The discrete logarithm problem for a finite cyclic group of order p (a large prime) provides a bridge from combinatorial group theory to cryptographic protocols. A finite cyclic group of order p can be realized as the set of integers coprime to p modulo p, i.e., the finite set of integers {1, 2, . . . , p−1} which forms a group under multiplication modulo p. Given fixed integers a, b ∈ {1, 2, . . . , p−1}, where a is a primitive root modulo p, the discrete logarithm problem is to find an integer x (with $1 \leq x \leq p-1$) such that $$b = a^x \pmod{p}.$$

Another realization of a finite cyclic group of order p can be specified by a presentation with one generator a and one defining relation $a^p = 1$ where 1 denotes the identity element. Note that every element g of the group has a unique canonical form $g = a^x$ where x is an integer between one and p. It is clear that the discrete logarithm problem for a finite cyclic group of order p is thus identical to the canonical word problem for this group with respect to an arbitrary primitive element a.

The present invention employs the problems and algorithms of combinatorial group to create novel cryptographically secure algebraic key establishment protocols. More specifically, the cryptographic security of these protocols depend on the existence of groups with feasible word problem and hard conjugacy problem. Such an approach does not exist in the prior art.

SUMMARY OF THE INVENTION

It is the primary object of the present invention to provide novel cryptographically secure algebraic key establishment protocols based on a key establishment algebraic system KEAS.

Let $(U, \theta_U)$ denote a monoid whose generating set $\{u_1, u_2, \ldots\}$ is enumerable and whose law of composition $$\theta_U : U \times U \to U$$

is feasibly computable. Let $(V, \theta_V)$ denote another such monoid. A KEAS is a five-tuple $(U, V, \beta, \gamma_1, \gamma_2)$ where $$\beta: U \times U \to V, \gamma_i : U \times V \to V (i=1,2)$$

are feasibly computable functions satisfying the following properties.

(i) For all elements x, $y_1$, $y_2 \in U$ $$\beta(x, \theta_U(y_1, y_2)) = \theta_V(\beta(x, y_1), \beta(x, y_2))$$

(ii) For all elements x, y ∈ U $$\gamma_1(x, \beta(y, x)) = \gamma_2(y, \beta(x, y))$$

It is an object of the present invention to provide an apparatus which can perform monoid multiplication for KEAS.

It is an object of the present invention to provide a novel algebraic key agreement protocol based on KEAS=(U, V, β, $\gamma_1$, $\gamma_2$) where U=V=G is a group.

It is an object and feature of the present invention to provide a cryptographically secure algebraic key agreement protocol whose security is based on the existence of groups whose word problem can be solved in polynomial time while no polynomial time algorithm to solve the generalized conjugacy problem is known.

It is an object and feature of the present invention to provide a cryptographically secure algebraic key agreement protocol which is based on the computation of a list of randomly rewritten conjugates in a group, thus reducing the steps and calculations in executing the protocol. This allows for easy implementation of the algorithms on low level computing devices with table driven modules.

It is an object of the present invention to provide an algebraic key agreement protocol based on KEAS=(U, V, β, $\gamma_1$, $\gamma_2$) where U=V=G is the braid group.

It is an object of the present invention to provide an apparatus which randomly rewrites a word in the braid group in linear time in the word length.

A key transport protocol is an algorithm, initiated by an input, defined by a sequence of steps, which enables one party to securely transfer a key to another party. The key transport protocol is said to run in polynomial time if the number of steps required to transfer the key is a polynomial in the bit length of the input. If the polynomial is of the first degree, the key transport protocol is said to run in linear time.

It is an object and feature of the present invention to provide a cryptographically secure algebraic key transport protocol based on KEAS which allows for a linear time secure transfer of an encrypted key and requires polynomial time decryption of said encrypted key.

It is an object and feature of the present invention to provide a cryptographically secure algebraic key transport protocol based on KEAS=(U, V, $\beta$, $\gamma_1$, $\gamma_2$) where U and V are monoids and U acts on a message space. The key transport protocol is a combination of the algebraic key agreement protocol based on KEAS, together with an apparatus which efficiently compares members of the message space. This allows for linear time secure transfer of an element of the message space and requires a polynomial time algorithm for comparison and retrieval of the message.

It is an object and feature of the present invention to provide a cryptographically secure algebraic key transport protocol based on KEAS=(U, V, $\beta$, $\gamma_1$, $\gamma_2$) where the message space=U=V is the braid group which acts on itself by multiplication. This allows for the linear time secure transfer of an element of the message space (randomly rewritten word in the braid group) and requires a polynomial time algorithm to obtain a canonical form and decrypt the message.

It is an object and feature of the present invention to provide a cryptographically secure algebraic key transport protocol based on KEAS=(U, V, $\beta$, $\gamma_1$, $\gamma_2$) where the message space=U=V is the braid group which acts on itself by conjugation. This allows for the linear time secure transfer of an element of the message space (randomly rewritten word in the braid group) and requires a polynomial time algorithm to obtain a canonical form and decrypt the message.

It is an object of the present invention to provide a cryptographically secure algebraic key transport protocol based on KEAS=(U, V, $\beta$, $\gamma_1$, $\gamma_2$) where U=V is the braid group and the message space is a free group.

The system according to the invention is particularly suited towards implementation using currently available digital technology, commercially popular microprocessor based systems, and other affordable digital components. Significant portions of the system may be implemented and significant portions of the method according to the invention may be performed by software in a microcomputer based system. Moreover the system is quite suitable for implementation on emerging computer technologies, e.g., quantum computers.

DETAILED DESCRIPTION OF THE PREFERRED EMBODIMENT

A General Algebraic Key Agreement Protocol

Figure 1:
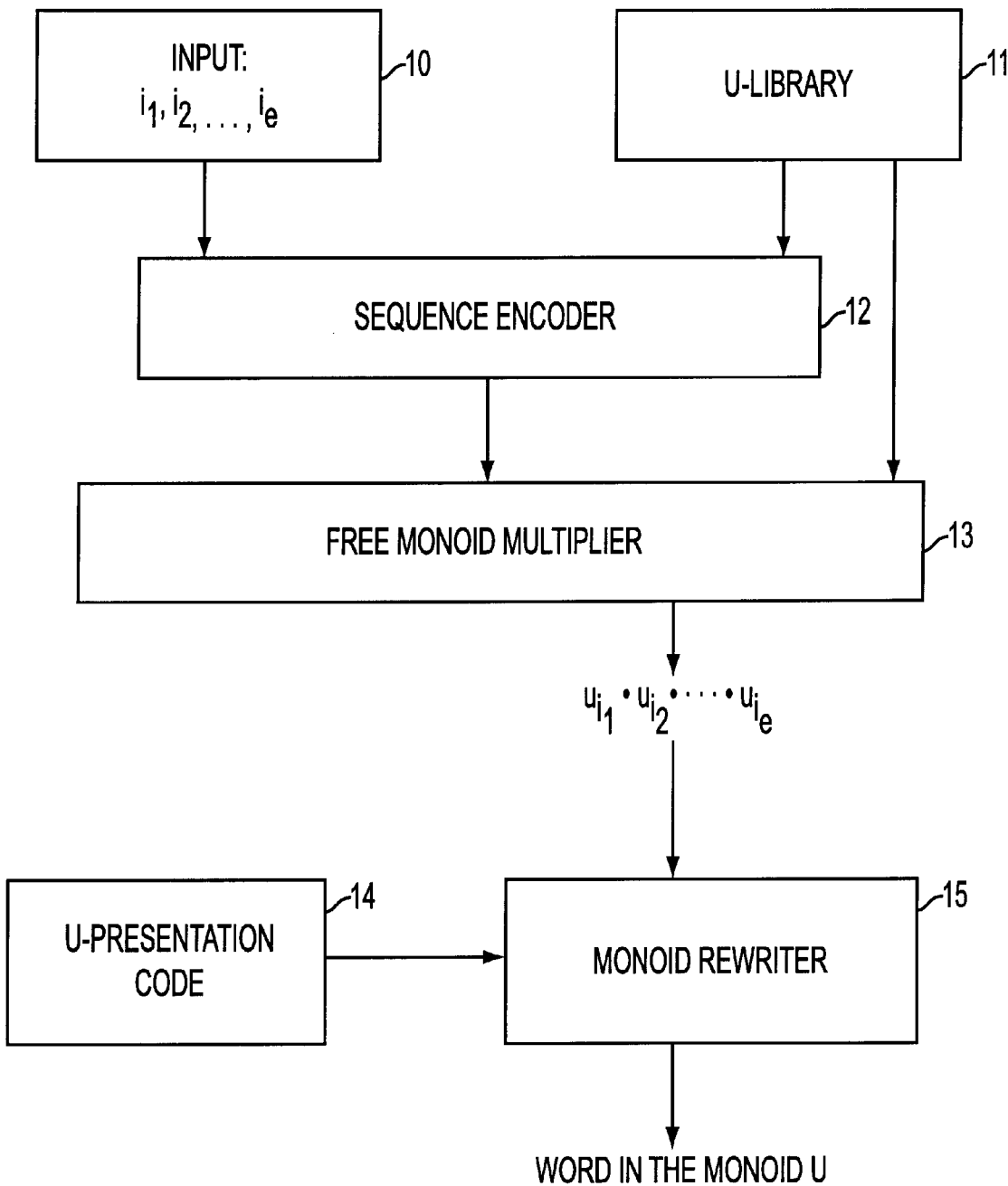
FIG. 1 shows an exemplary preferred embodiment of an apparatus which performs monoid multiplication.
Figure 2:
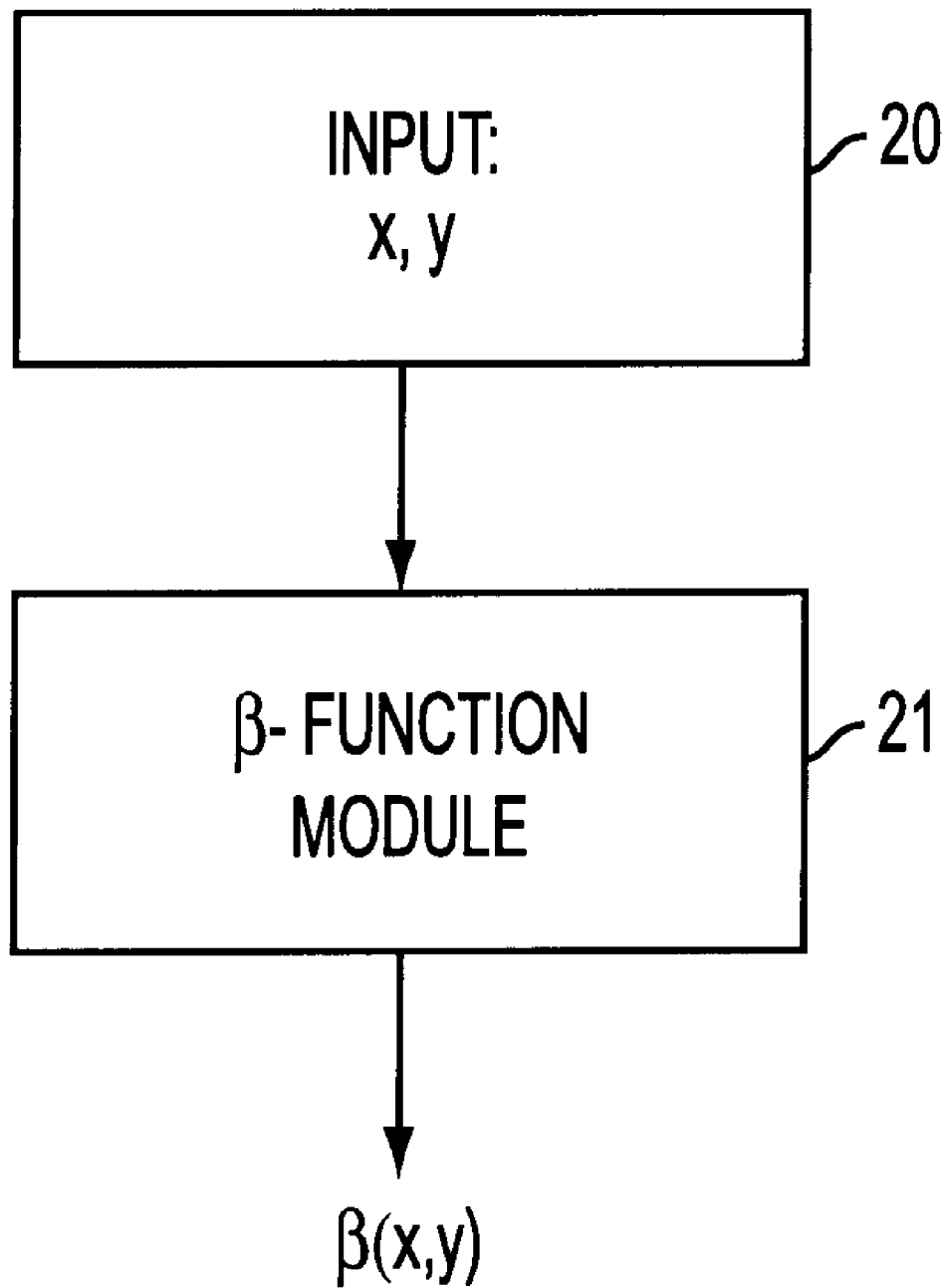
FIG. 2 shows a $\beta$-function module.
Figure 3:
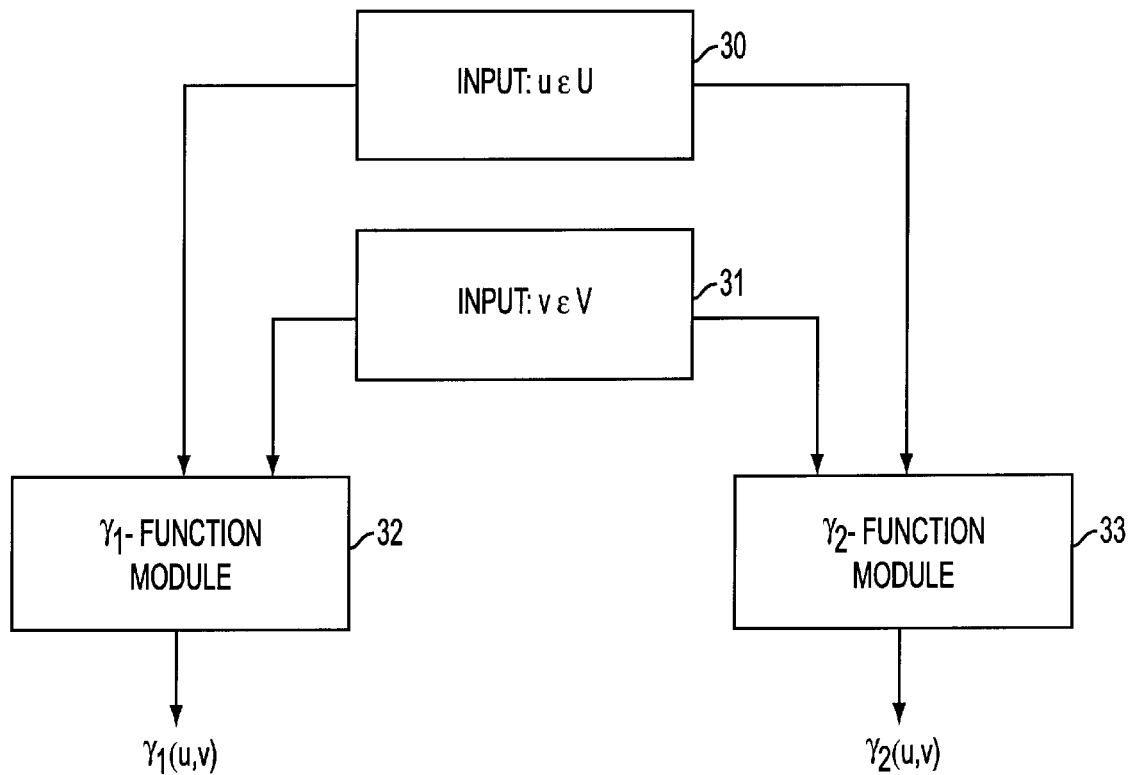
FIG. 3 shows a $\gamma_1$, $\gamma_2$-function module.

A preferred embodiment of an apparatus which performs an algebraic key agreement protocol based on KEAS will now be described in detail. The algebraic key-agreement protocol requires an apparatus which can perform monoid multiplication. A preferred exemplary embodiment of such an apparatus is depicted with block diagrams in FIG. 1, and is described as follows.

Let (U, $\theta_U$) denote a monoid whose generating set $\{u_1, u_2, \ldots\}$ is enumerable and whose law of composition $$\theta_U : U \times U \to U$$

is feasibly computable. The U-Library 11 consists of the set of generators $\{u_1, u_2, \ldots\}$. A sequence of indices 10 along with the U-Library 11 is presented to the Sequence Encoder 12. The Sequence Encoder 12 chooses $u_{i_1}, u_{i_2}, \ldots, u_{i_e}$ from the U-library 11 and presents this to the Free Monoid Multiplier 13 which then concatenates the elements to yield the output $u_{i_1} \cdot u_{i_2} \ldots u_{i_e}$. The monoid U can be viewed as a quotient of the free monoid (generated by the U-Library) modulo a set of rewriting rules. The U-Presentation Code 14 consists of this set of rewriting rules. The Monoid Rewriter 15 computes the equivalence class of $u_{i_1 \cdot i_2} \ldots u_{i_e}$ modulo the rewriting rules in the U-Presentation Code 14. The result is a word in the monoid U. An apparatus which performs the internal binary operation of U can now be specified. Given $x = u_{j_1} \cdot u_{j_2} \ldots u_{j_a}$, and $y = u_{k_1} \cdot u_{k_2} \ldots u_{k_b}$, to obtain the product $x \cdot y$, simply input the long sequence $j_1, j_2, \ldots, j_a, k_1, k_2, \ldots k_b$ into 10. The output of the Monoid Rewriter 15 will be $x \cdot y$.

A preferred embodiment of an apparatus which performs the algebraic key-agreement protocol based on KEAS is depicted in block diagrams in FIGS. 1 through 7. Recall that a KEAS is a five-tuple (U, V, $\beta$, $\gamma_1$, $\gamma_2$) where U and V are monoids with feasibly computable laws of composition and $\beta$, $\gamma_1$, $\gamma_2$ are functions satisfying the following properties:

(i) For all x, $y_1$, $y_2 \in U$ $$\beta(x, \theta_U(y_1, y_2)) = \theta_V(\beta(x, y_1), \beta(x, y_2))$$

(ii) There exists easily computable functions $\gamma_i: U \times V \to V$ (i=1, 2) such that $$\gamma_1(x, \beta(y, x)) = \gamma_2(y, \beta(x, y)).$$

Let x, y $\in$U denote the Input 20. The $\beta$-Function Module 21 computes the value of $\beta(x, y)$. Let u $\in$U, be the Input 30, and let v $\in$ V be the Input 31. The $\gamma_1$-Function Module 32 computes $\gamma_1(u, v)$ while the $\gamma_2$-Function Module 32 computes $\gamma_2(u, v)$.

With the functions $\beta$, $\gamma_1$, $\gamma_2$ in place the algebraic key agreement protocol can now be described. Given a subset S $\subseteq$ U, the submonoid generated by S, denoted <S>, is defined to be the smallest submonoid of U which contains S, i.e., $$<S> = \cap \text{ submonoids of } U \text{ containing } S.$$

Remark that <S> coincides with the set of all possible products in products of elements in the set S, including the empty product (which is the identity element).

The algebraic key agreement protocol involves two users, A(lice) and B(ob). User A is assigned a set of distinct elements in U, $$\{s_1, \ldots, s_n\}$$

which generate a submonoid of U denoted $$S_A = <s_1, s_2, \ldots, s_n>.$$

In the discussion below we utilize functional notation for elements in the monoid U: if x is an element in U, x is expressible as a word in the generators of U and we write $$x = x(u_{i_1}, u_{i_2}, \ldots, u_{i_n}).$$

Remark that each $s_i$ is expressible as a word in the generators of U: for i=1, 2, ... n, $$s_i = s_i(u_{i_1}, u_{i_2}, \ldots).$$

Likewise user B is assigned elements $\{t_1, \ldots, t_m\}$ which generate a submonoid of U denoted $$T_B = <t_1, t_2, \ldots, t_m>.$$

Here again each $t_j$ is expressible as a word in the generators of U: for j=1, 2, ..., m, $$t_j = t_j(u'_{j1}, u'_{j2}, \ldots).$$

Figure 4:
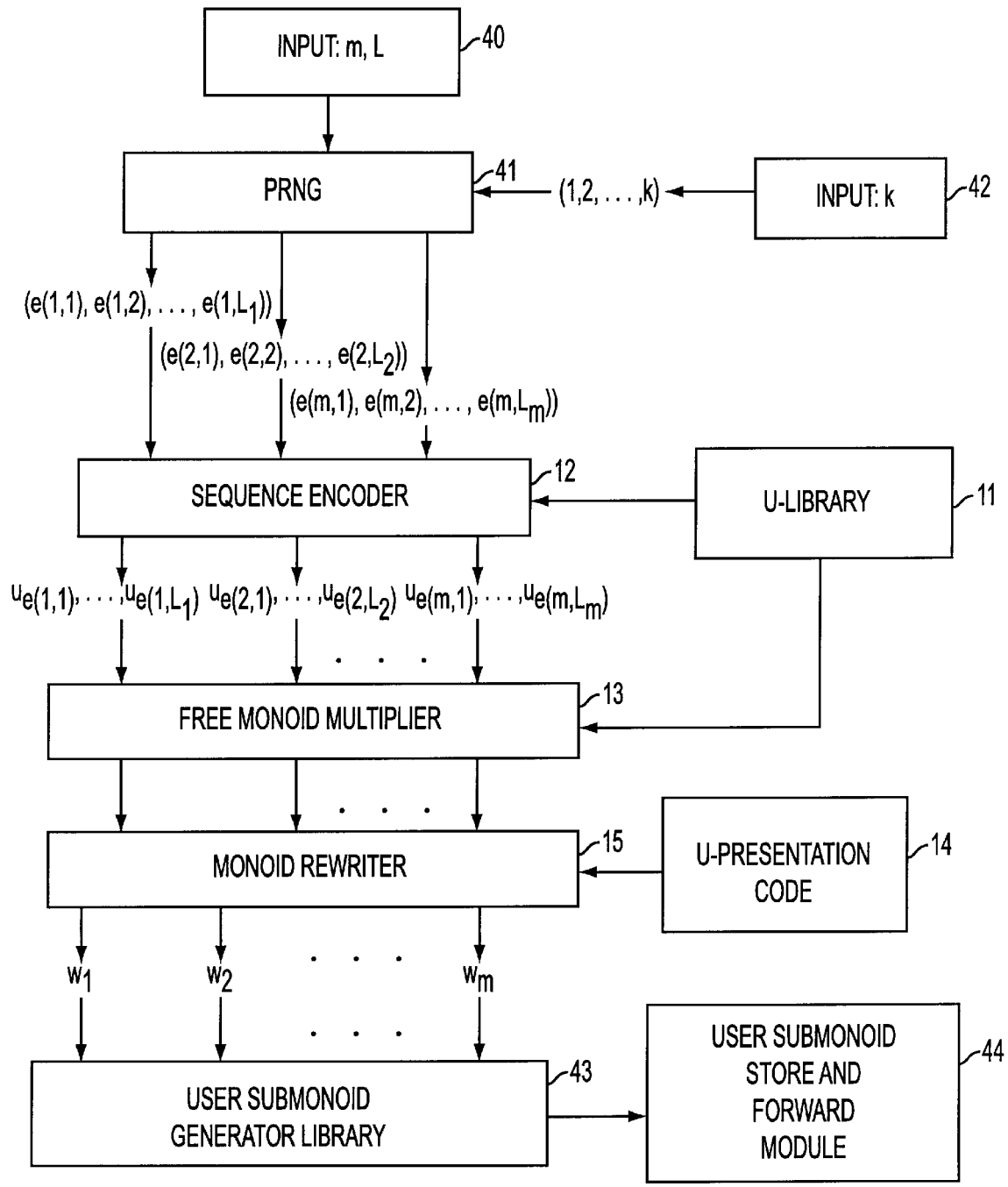
FIG. 4 shows a submonoid generator

An apparatus for assigning an arbitrary set $w_1, w_2 \ldots w_m$ of m words to a user is depicted in FIG. 4. The key component of this apparatus is a cryptographically secure pseudorandom number generator PRNG. The definition of a PRNG is given in Bruce Schneier, "Applied Cryptography Second Edition: protocols, algorithms, and source code in C," 1996, John Wiley, page 45, and is well known in the art. In all subsequent discussions in the preferred embodiment, a PRNG will always refer to such a cryptographically secure pseudorandom number generator.

Let m, k≧1 denote integers. Let $L = \{L_1, L_2, \ldots L_m\}$ denote a vector of positive integers. The Input: m, L 40 together with the Input: k 42 is presented to a pseudorandom number generator PRNG 41 which creates m lists of integers of lengths $L_1, L_2, \ldots L_m$, respectively; each list $\{e(i, 1), e(i, 2), \ldots, e(i, L_i)\}$ (for i=1, 2, ... m) consisting of integers randomly chosen from the set $\{1, 2, \ldots k\}$. These lists, together with the U-Library 11 are then presented to the Sequence Encoder 12 whose output goes to the Free Monoid Multiplier 13. The output of the Free Monoid Multiplier 13 is then sent to the Monoid Rewriter 15 into which the U-presentation code has already been presented. The final output is $w_1, w_2, \ldots, w_m$ which creates a User Submonoid Generator Library 43 and then sent to the User Submonoid Store and Forward Module 44.

The process of key exchange begins with both users choosing secret elements in their respective submonoids, $$a \in S_A, a = a(s_1, s_2, \ldots, s_n)$$

$$b \in T_B, b = b(t_1, t_2, \ldots, t_m).$$

Figure 5:
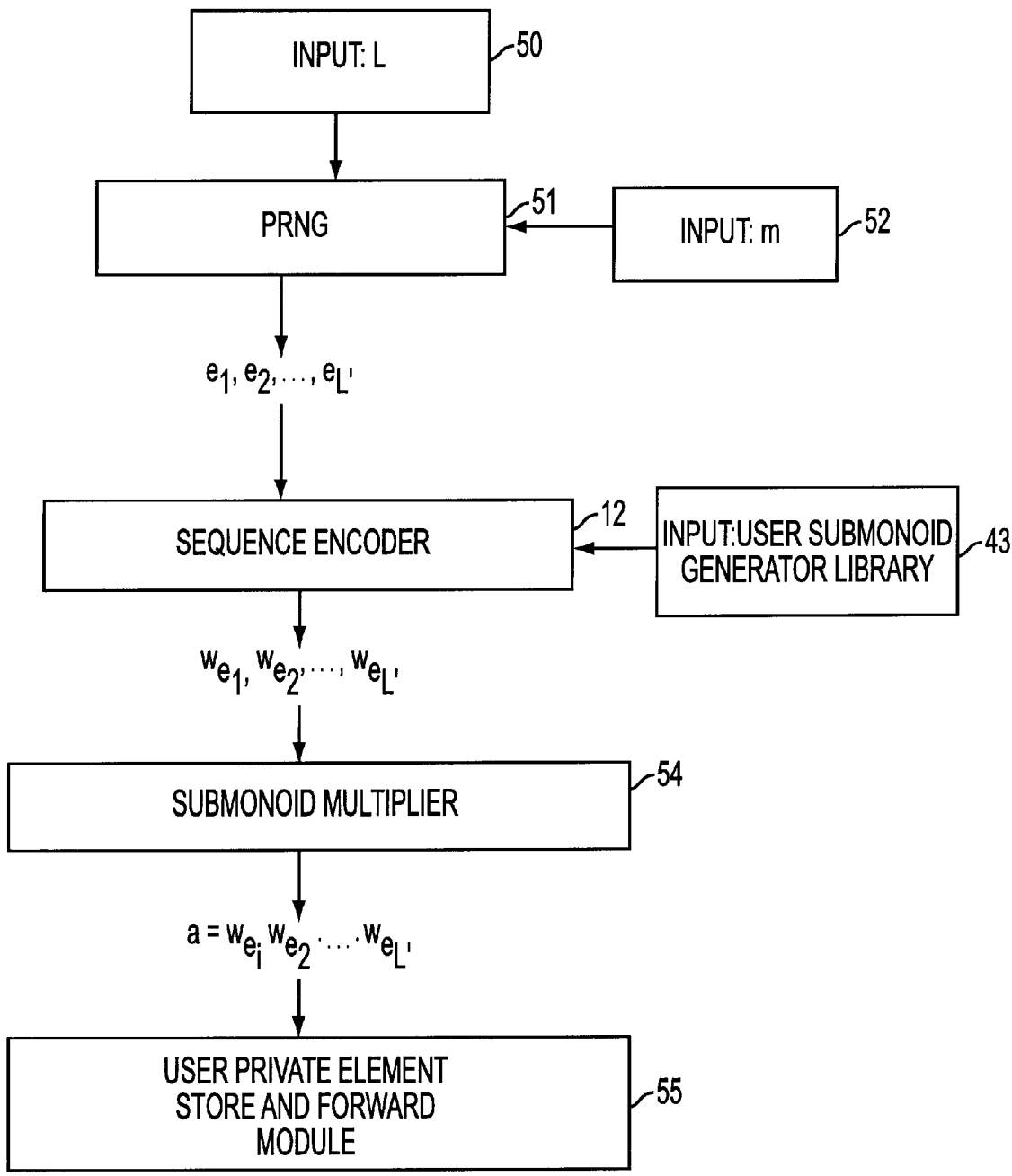
FIG. 5 shows a submonoid random element generator.

This is depicted in FIG. 5. Let L, m denote positive integers. The Input: L 50 together with the Input: m 52 is sent to a pseudorandom number generator PRNG 51 which randomly chooses L'≦L positive integers $e_1, e_2, \ldots, e_L$, such that each $e_i \leq m$ (for i=1, 2, ... L'). This sequence of randomly chosen integers is presented to the Sequence Encoder 12 which also receives the Input of the User Submonoid Generator Library 43 which consists of $w_1, w_2, w_3, \ldots$ The Sequence Encoder 12 then chooses $w_{e_1}, w_{e_2}, \ldots w_{e_L}$, and presents this to the Submonoid Multiplier 54 which computes the product $a = w_{e_1} \cdot w_{e_2} \ldots w_{e_L}$, and sends it to the User Private Element Store and Forward Module 55.

User A now transmits the Input 60

$$s_1, s_2, \ldots s_n$$

(where each $s_i$ is a word in the generators of U) via the Communication module: Transmit and Receive 62, and user B transmits the Input 61

$$t_1, t_2, \ldots, t_m$$

via the Communication module: Transmit and Receive 62. The received list $\{t_1, t_2, \ldots, t_m\}$ together with Alice's secret key, the Input: a 63 is then forwarded to the β-Function Module 23 yielding the list $$\beta(a, t_1), \ldots, \beta(a, t_m)$$

which is stored in the Store and Forward Module 65. Similarly, the received list $\{s_1, s_2, \ldots, s_n\}$ together with Bob's secret key, the Input: b 64 is then forwarded to the β-Function Module 23 yielding the list $$\beta(b, s_1), \ldots, \beta(b, s_n)$$

which is stored in the Store and Forward Module 66.

User A now transmits the Input 70

$$\beta(a, t_1), \ldots, \beta(a, t_m)$$

(which was stored is the Store and Forward Module 65) via the Communication module: Transmit and Receive 62, and similarly user B transmits the Input 71

$$\beta(b, s_1), \ldots, \beta(b, s_n)$$

(which was stored is the Store and Forward Module 66) via the Communication module: Transmit and Receive 62.

The received list $\beta(b, s_1), \ldots, \beta(b, s_n)$, together with the secret list of integers $e_1, e_2, \ldots e_L$, generated by the PRNG 51 to produce Alice's secret key $$a = s_{e_1} \cdot s_{e_2} \ldots s_{e_L}.$$

is presented to the V-Monoid Multiplier 72 which then (using property (i) that β satisfies) computes the product $$\beta(b, a) = \beta(b, s_{e_1}) \cdot \beta(b, s_{e_2}) \ldots \beta(b, s_{e_L}).$$

The element β(b, a) together with the secret key a are sent to the $\gamma_1$-Function 32 to produce the final output $$\gamma_1(a, \beta(b, a)).$$

In a completely analogous manner, the received list $\beta(a, t_1), \ldots, \beta(a, t_m)$, together with the secret list of integers $f_1, f_2, \ldots, f_{L''}$ generated by the PRNG 51 to produce Bob's secret key $$b = t_{f_1} \cdot t_{f_2} \ldots t_{f_{L''}}$$

is presented to the V-Monoid Multiplier 72 which then (using property (i) that β satisfies) computes the product $$\beta(a, b) = \beta(a, t_{f_1}) \cdot \beta(a, t_{f_2}) \ldots \beta(a, t_{f_{L''}}).$$

The element $\beta(a, b)$ together with the secret key b are sent to the $\gamma_2$-Function 33 to produce the final output $$\gamma_2(b,\beta(a,b)).$$

By property (ii) it immediately follows that $$\gamma_1(a,\beta(b,a))=\gamma_2(b,\beta(a,b))$$

which is the common key exchanged between Alice and Bob.

Example 1

A first example of an algebraic key agreement protocol of the type detailed above can be obtained by considering the case where U=V=G is a group (a monoid where every element has an inverse). In this case the function $\beta$, $$\beta: G \times G \to G$$

is chosen to be conjugation:

$$\beta(x,y)=x_{-1}yx.$$

The functions $\gamma_1$ and $\gamma_2$ are chosen to be $$\gamma_1(u,v)=u^{-1}u\gamma_2(u,v)=v^{-1}u.$$

It is easy to see that properties (i), (ii) hold.

The asymmetric key agreement protocol in this situation can be described as follows. Users A and B publicly choose subgroups $$S_A=\langle s_1,s_2,\ldots s_m \rangle \, S_B=\langle t_1,\ldots,t_n \rangle,$$

and secret elements $a \in S_A$ and $b \in S_B$. User A transmits the collection of conjugates $$a^{-1}t_1a, a^{-1}t_2a, \ldots, a^{-1}t_m a$$

and similarly user B transmits $$b^{-1}s_1b, b^{-1}s_2b, \ldots, b^{-1}s_n b$$

Recalling that the conjugate of the product of two elements is the product of the conjugates of those elements, users A and B are now in a position to compute, respectively, the elements $$b^{-1}ab, a^{-1}ba.$$

In order to attain a common key, user A now multiplies $b^{-1}ab$ on the left by $a^{-1}$ to obtain $$[a,b]=a^{-1}b^{-1}ab,$$

and user B multiplies $a^{-1}b$ a on the left by $b^{-1}$ to obtain [b, a] and then computes the inverse of [b, a] which is [a, b]. Note that this is consistent with the general system notation in that $$[a,b]=\gamma_1(a,\beta(b,a))=\gamma_2(b,\beta(a,b)).$$

The fact that there exist groups with solvable word problem and unsolvable conjugacy problem, shows that at least in principle, the key agreement protocol for groups may be algorithmically unbreakable. In practice, however, one really works with a computer with only a finite amount of memory and this is equivalent to working only with words of bounded length in the group G. Thus everything is reduced to a finite amount of computation, so from this point of view all these problems are decidable.

The above protocol is secure and feasible provided the group G has a feasibly solvable word problem and hard conjugacy problem. There are many groups, however, where the word problem can be solved in polynomial time (in the word length), while at the same time, there is no known polynomial time algorithm for solving the generalized conjugacy problem (functional form). An illustrative example of such a group is the braid group of N symbols.

The braid group was first systematically studied by Emil Artin, "Theorie der Zöpfe," Hamb. Abh. 4 (1925), pages 47–72. In that paper, the so called Artin generators $x_1, x_2, \ldots x_N$ for the Braid group of N symbols are introduced. They satisfy the relations $$x_i x_j = x_j x_i, \text{ if } |j-i| \geq 2 \text{ and } 1 \leq i,j \leq N$$

$$x_i x_{i+1} x_i = x_{i+1} x_i x_{i+1}, \text{ if } 1 \leq i \leq N-1.$$

Figure 8:
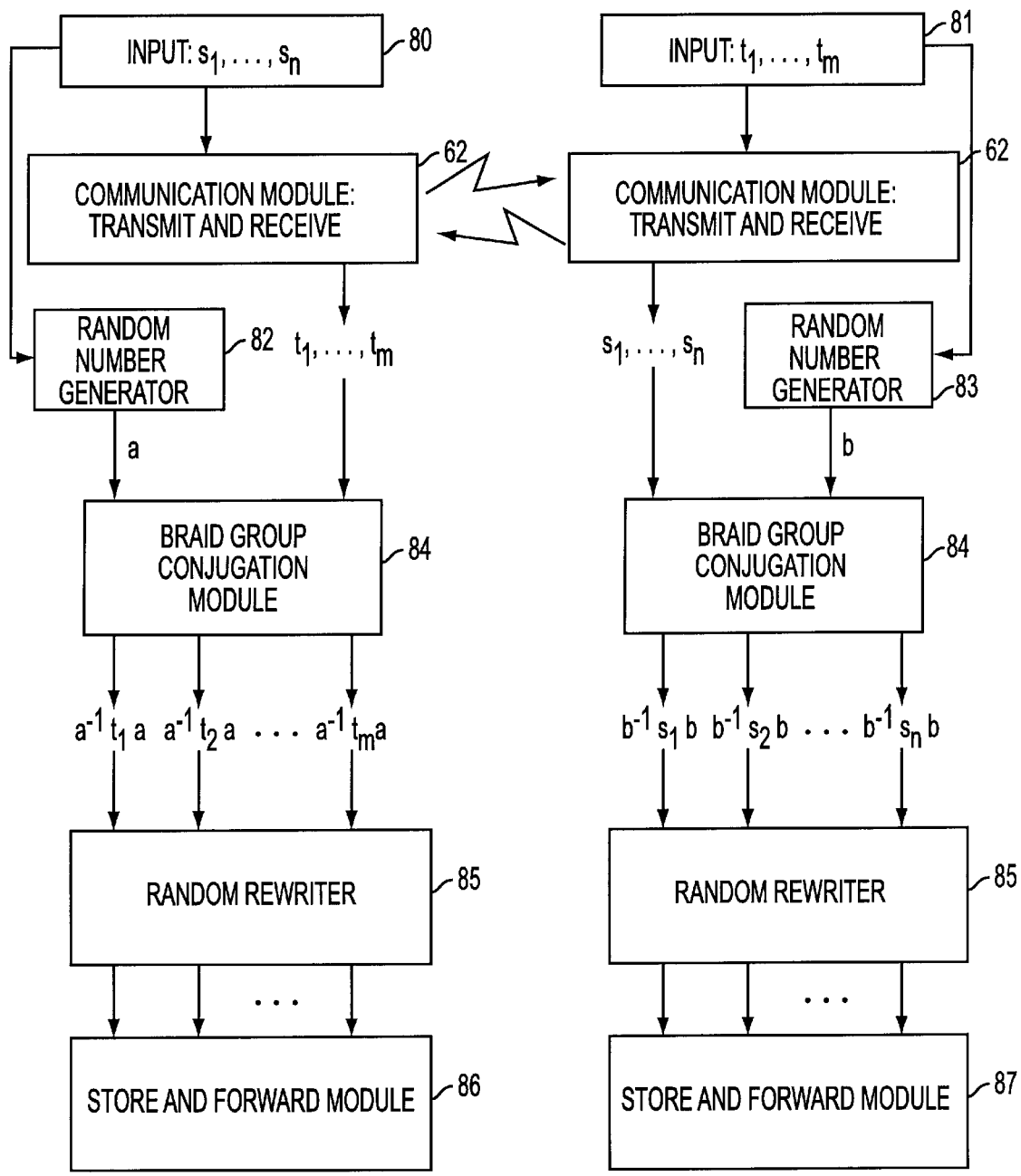
FIG. 8 shows an exchange of public information of an algebraic key agreement protocol based on the braid group.
Figure 9:
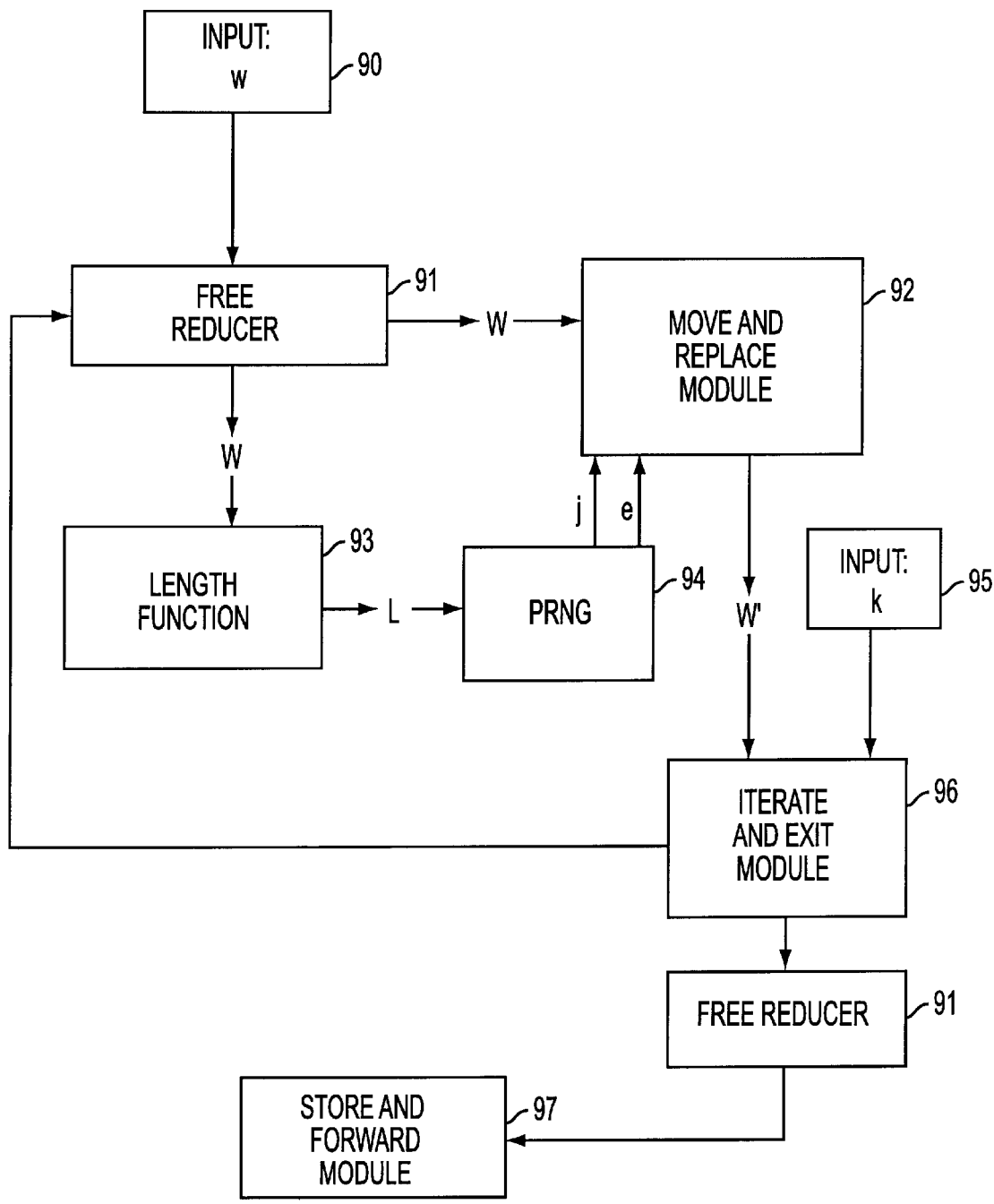
FIG. 9 shows a preferred embodiment of a random rewriter for the braid group
Figure 10:
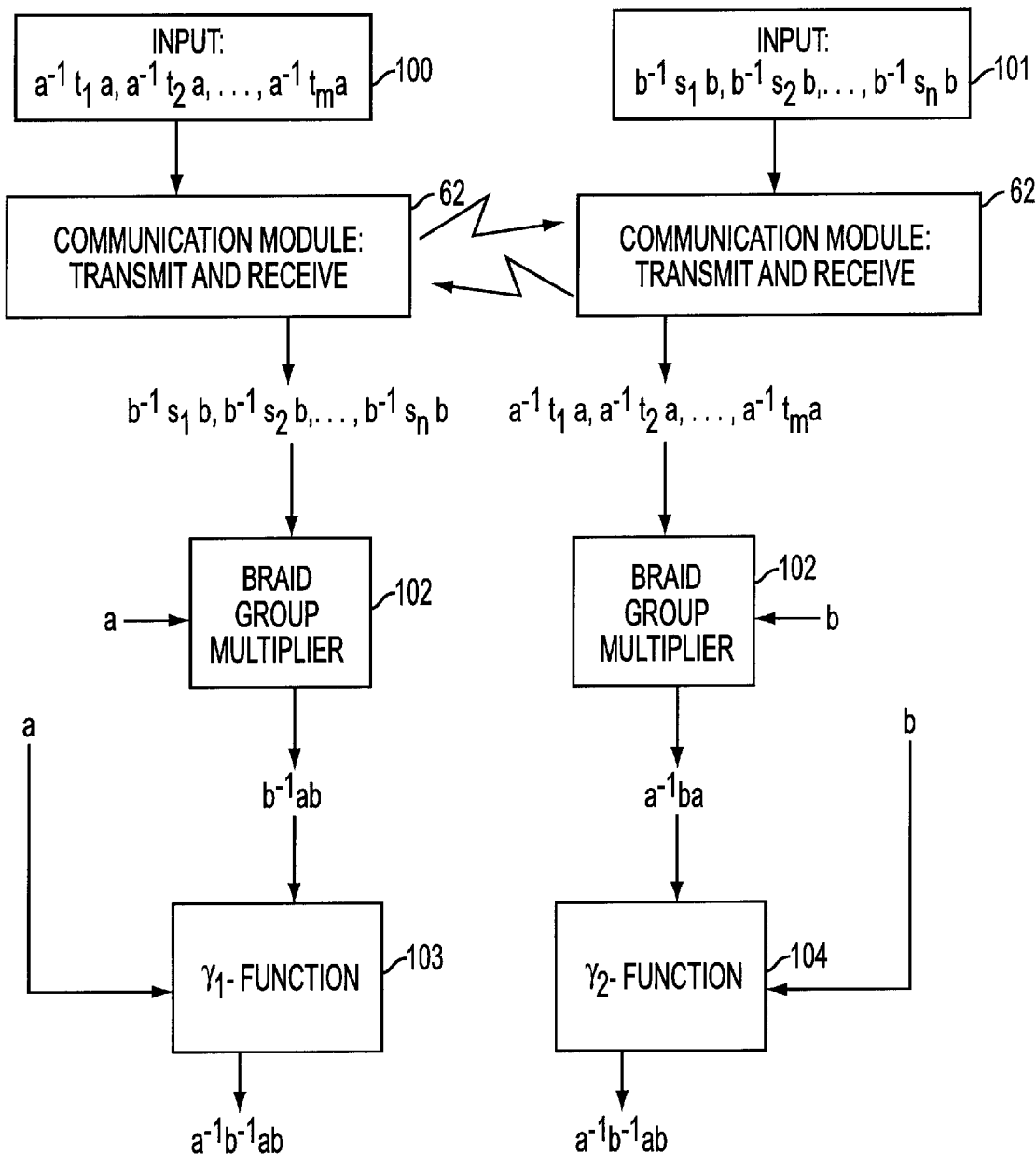
FIG. 10 shows a preferred embodiment of an apparatus which performs the algebraic key agreement protocol based on the braid group.

A preferred embodiment of an apparatus which performs the key agreement protocol for the braid group is depicted in block diagrams in FIGS. 8 to 10. This apparatus will now be described in detail.

Users A and B wish to exchange keys via public discussion over an insecure channel. Fix G to be the braid group on N generators. User A randomly chooses elements $s_1, s_2, \ldots, s_n \in G$ (Input 80) and transmits them to user B via the Communication Module 62. Similarly, user B randomly chooses elements $t_1, t_2, \ldots, t_m$ (Input 81) and transmits them to user A via the Communication Module 62. It can be assumed that $s_1, s_2, \ldots, s_n, t_1, t_2, \ldots t_n$ are publicly known.

The Input: $s_1, s_2, \ldots, s_n$ 80 is sent to the Random Word Generator 82 which produces a word a which is a secret word in the generators $s_1, s_2, \ldots, s_n$. The process for doing this is depicted in a more general setting in FIG. 5. The Input: $t_1, t_2, \ldots, t_m$ 81 is sent to the Random Word Generator 83 which produces a word b which is a secret word in the generators $t_1, t_2, \ldots t_m$. The secret word a together with the generators $t_1, t_2, \ldots, t_m$ are then presented to the Braid Group Conjugation Module 84 which computes the list of conjugate elements $$a^{-1}t_1 a, a^{-1}t_2 a, \ldots a^{-1}t_m a.$$

Similarly, the secret word b together with the generators $s_1, s_2, \ldots, s_n$ are then presented to the Braid Group Conjugation Module 84 which computes the list of conjugate elements $$b^{-1}s_1 b, b^{-1}s_2 b, \ldots b^{-1}s_n b.$$

In both cases, these lists are then sent to the Random Rewriter 85 which randomly rewrites each word in the list. The randomly rewritten lists are then sent to the Store and Forward Modules 86, 87.

A preferred embodiment of the Random Rewriter 85 is depicted in block diagrams in FIG. 9. The Input: w 90 is sent to the Free Reducer 91. The Free Reducer 91 searches for subwords of the form $x x^{-1}$ and $x^{-1} x$ in the word w (where x is an arbitrary word in the Artin generators of G) and replaces $xx^{-1}$ and $x^{-1} x$ by the identity element. The Free Reducer 91 freely reduces the word w to produce the (possibly shorter) word W. The word W is then presented to the Length Function which computes its length L. The length L is then sent to a pseudorandom number generator PRNG 94 which randomly produces an integer j (where $1 \leq j \leq L$) and a bit e which is either 0 or 1. The freely reduced word W together with the integer j and the bit e are then sent to the Move and Replace Module 92 which produces a new word W' in the following manner. Recall that W is a word in the Artin generators $x_1, x_2, \ldots, x_N$ of length L, say $W = x_{r_1}^{e_1} \cdot x_{r_2}^{e_2} \ldots x_{r_L}^{e_L}$ where for $i=1, 2, \ldots, L$ each $e_i = \pm 1$ and $r_i \in \{1, 2, \ldots, N\}$. If e=0 and j=1, halt the process. If e=0 and j>1 consider the subword (of length 2 at the $j^{th}$ position) $x_{r_{j-1}}^{e_{j-1}} x_{r_j}^{e_j}$. If $|r_{j-1} - r_j| \geq 2$ replace this subword by $x_{r_j}^{e_j} x_{r_{j-1}}^{e_{j-1}}$ and set j=j−1. Keep repeating until either j=1 or $|r_{j-1} - r_j| = 1$. If $|r_{j-1} - r_j| 1$, replace the string $x_{r_{j-1}}^{e_{j-1}} x_{r_j}^{e_j}$ by a four symbol subword arising from the Artin relations. The complete list of substitutions is given as:

$$x_j x_{j+1} \to x_{j+1} x_j x_{j+1} x_j^{-1}$$

$$x_j x_{j+1}^{-1} \to x_{j+1}^{-1} x_j^{-1} x_{j+1} x_j$$

$$x_j^{-1} x_{j+1} \to x_{j+1} x_j x_{j+1}^{-1} x_j^{-1}$$

$$x_j^{-1} x_{j+1}^{-1} \to x_{j+1} x_j^{-1} x_{j+1}^{-1} x_j^{-1}$$

$$x_{j+1} x_j \to x_j^{-1} x_{j+1} x_j x_{j+1}$$

$$x_{j+1} x_j^{-1} \to x_j^{-1} x_{j+1}^{-1} x_j x_{j+1}$$

$$x_{j+1}^{-1} x_j \to x_j x_{j+1} x_j^{-1} x_{j+1}^{-1}$$

$$x_{j+1}^{-1} x_j^{-1} \to x_j x_{j+1}^{-1} x_j^{+1} x_{j+1}^{-1}$$

In an analogous manner if e=1 the algorithm is the same except that one now considers the subword $x_{r_j}^{e_j} x_{r_{j+1}}^{e_{j+1}}$ and set j=j+1. So if e=0, move to the left; while if e=1, move to the right searching for two adjacent generators whose indices differ by one. As soon as they are found, they are replaced according to the substitutions listed above.

The output W' of the Move and Replace Module 92 together with the Input 95 of a positive integer k is then sent to the Iterate and Exit Module 96 which iterates the above procedure k times (by sending W' back to the Free Reducer 91) and then exits the procedure sending its output W' to the Free Reducer 91. The final freely reduced word is then sent to the Store and Forward Module 97.

The list $a^{-1}t_1 a, a^{-1}t_2 a, \ldots a^{-1}t_m a$, which was stored in the Store and Forward Module 86 becomes Input 100 and is presented to the Communication Module: Transmit and Receive 62. Likewise the list $b^{-1}s_1 b, b^{-1}s_2 b, \ldots b^{-1}s_n b$, which was stored in the Store and Forward Module 87 becomes Input 101 and is presented to the Communication Module: Transmit and Receive 62. These lists are broadcast over an insecure channel and can be assumed to be publicly known. The received list $b^{-1}s_1 b, b^{-1}s_2 b, \ldots b^{-1}s_n b$ together with user A's secret word a are then presented to the Braid Group Multiplier 102 which computes $b^{-1}a b$. The conjugate $b^{-1}a b$ together with user A's secret word a is sent to the $\gamma_1$-Function 103 which computes the final output $a^{-1}b^{-1}a b$. Correspondingly, the received list $a^{-1}t_1 a, a^{-1}t_2 a, \ldots a^{-1}t_m a$ together with user B's secret word b are then presented to the Braid Group Multiplier 102 which computes $a^{-1}b a$. The conjugate $a^{-1}b a$ together with user B's secret word b is sent to the $\gamma_2$-Function 104 which computes the final output $a^{-1}b^{-1}a b$ which is the exchanged key.

The total running time of this protocol will be polynomial time in the total bit length of the exchanged lists:

$$\{b^{-1}s_1 b, b^{-1}s_2 b, \ldots, b^{-1}s_n b\}, \{a^{-1}t_1 a, a^{-1}t_2 a, \ldots, a^{-1}t_m a\},$$

provided the integer k (Input 95, which counts the number of iterations used by the random rewriter) is not too large.

A General Algebraic Key Transport Protocol

A preferred embodiment of an apparatus which performs the general algebraic key transport protocol will now be described in detail. It is assumed that two parties A(lice) and B(ob) have already participated in an algebraic key agreement protocol of the type described previously (for monoids), so that both A and B are in possession of a common key k which is a word in the monoid U. Note that the common key k may be expressed as a word in the generators of U in many different ways. Each such expression is contained in the same equivalence class of the free monoid modulo the presentation code of U. In order to obtain a unique expression for k it is necessary to have a unique canonical form for all elements in U. In the key transport protocol which will now be presented, it is not assumed that k is in canonical form.

The key transport protocol for monoids is based on the action of the monoid on a set M which we term the message space. The action of the monoid U on M is a function $$U \times M \to M$$

which we denote $$(u, m) \to u(m) \in M$$

for each u $\in$ U, m $\in$ M, which satisfies the following conditions:

$$u(v(m)) = uv(m), \text{ for all } u, v \in U \text{ and } m \in M$$

$$1(m) = m, \text{ for all } m \in M.$$

Figure 6:
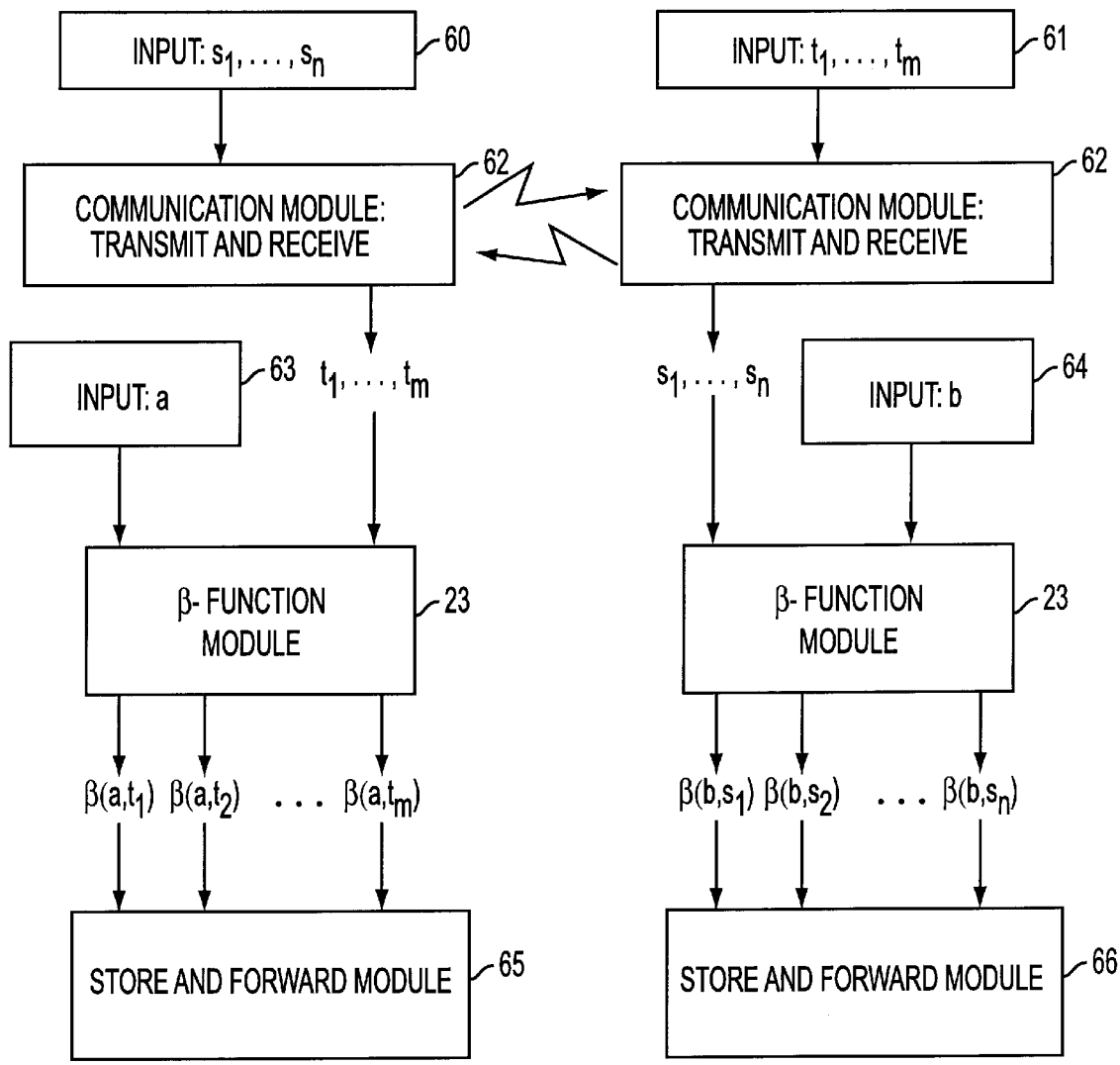
FIG. 6 shows an exchange of public information of an algebraic key agreement protocol based on monoids.
Figure 7:
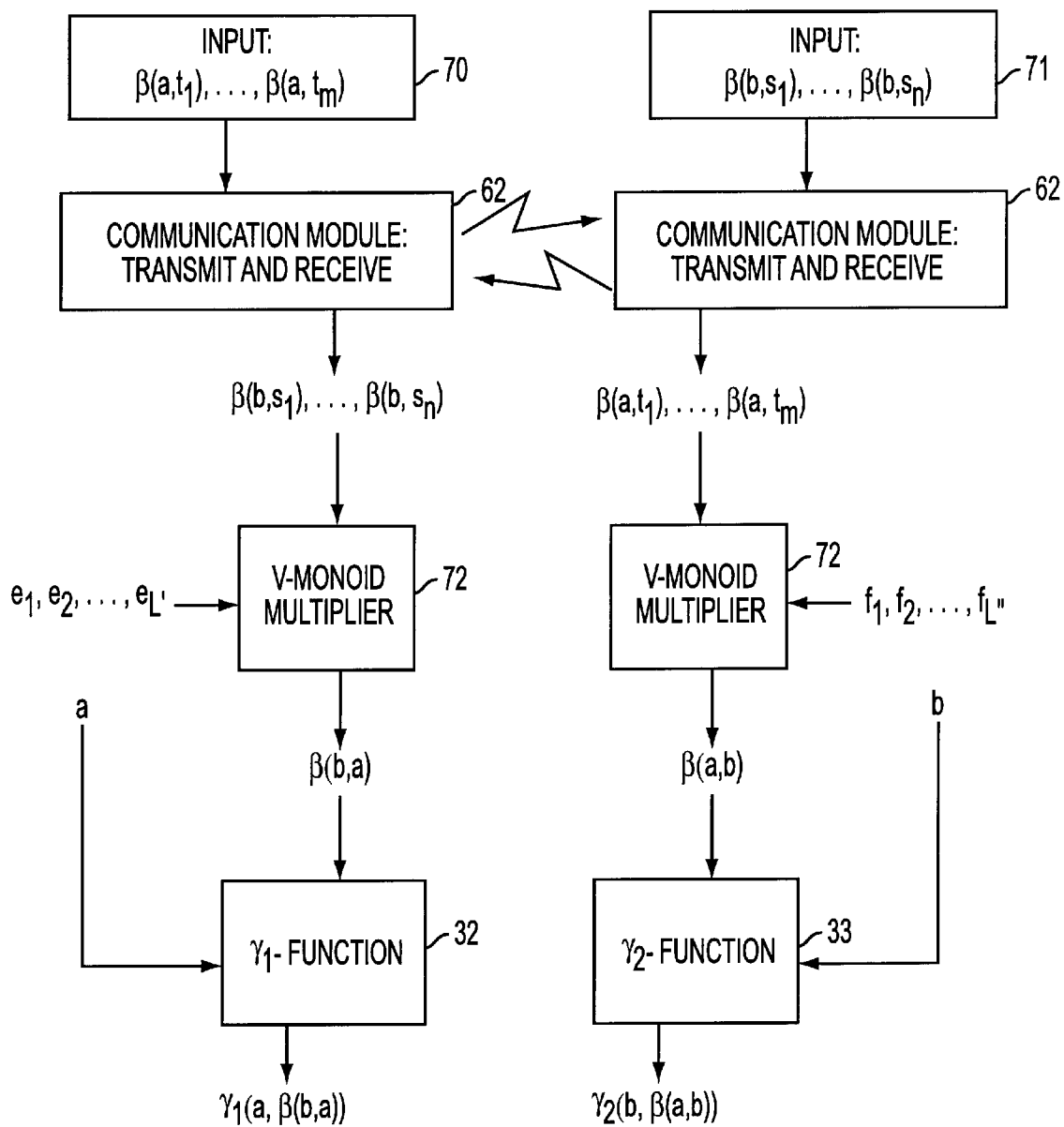
FIG. 7 shows a preferred embodiment of an apparatus which performs the algebraic key agreement protocol based on monoids.
Figure 11:
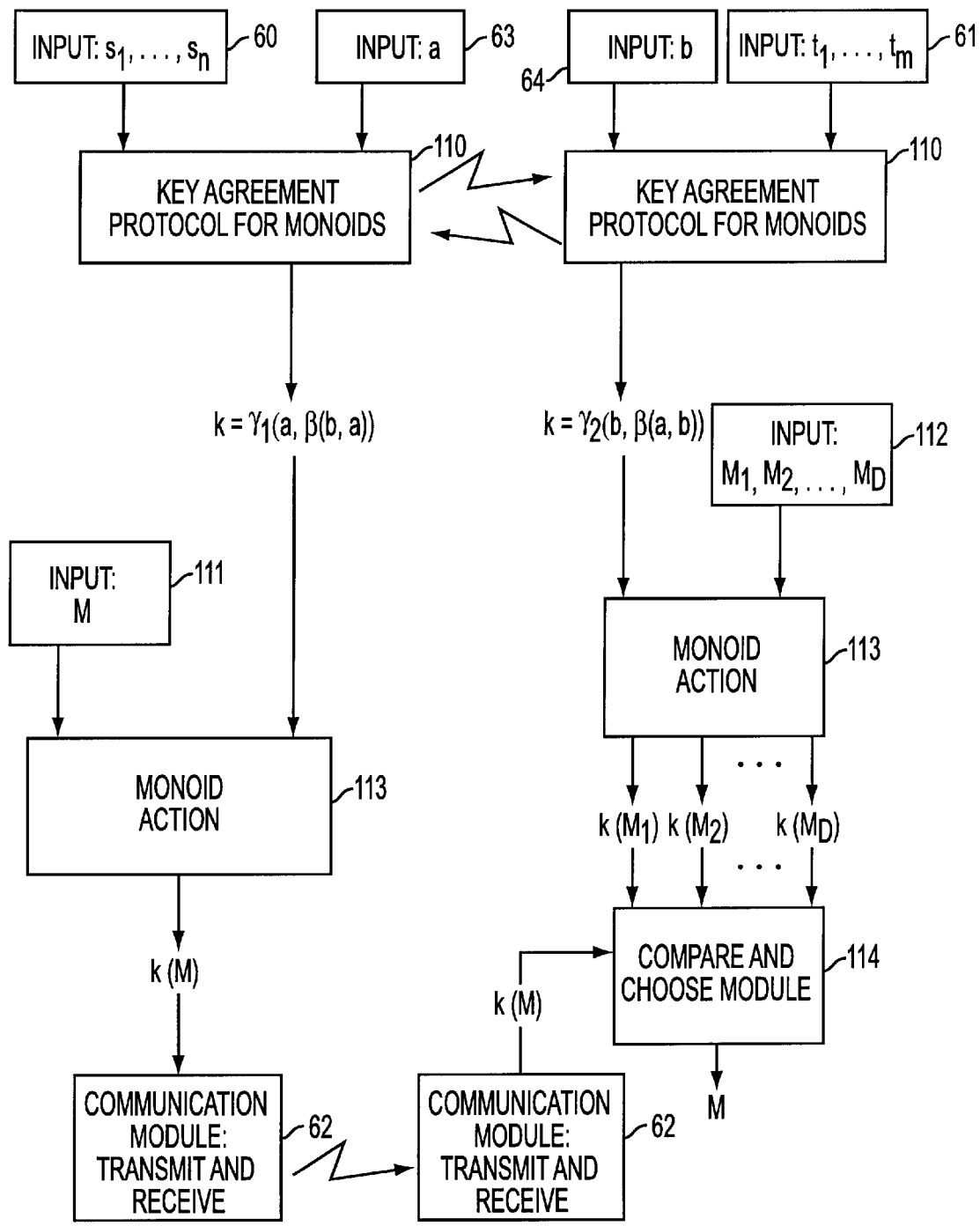
FIG. 11 shows a preferred embodiment of an apparatus which performs the algebraic key transport protocol for monoids.

A preferred embodiment of an apparatus which performs the key transport protocol for monoids is depicted in block diagrams in FIG. 11. First, a common key $$k = \gamma_1(a, \beta(b, a)) = \gamma_2(a, b)) \in U$$

is exchanged via the Key Agreement Protocol for Monoids 110 which was previously depicted in FIGS. 6 and 7. Fix distinct elements $$M_1, M_2, \ldots, M_D \in M$$

which is Input 112. The key transport protocol is a mechanism which allows A (the sender) to transfer a message $$M \in \{M_1, M_2, \ldots, M_D\}$$

to B (the receiver). The message M is the Input 111 which is sent to the Monoid Action 113 which computes the action of k on M which is k(M). The element k(M) is then sent to the Communication Module: Transmit and Receive 62 which transmits k(M) to B. Concurrently, the Input: $M_1, M_2, \ldots, M_D \in M$ 112 together with the key k (output of the Key Agreement Protocol for Monoids 110) is presented to the Monoid Action 113 which computes the elements k($M_1$), k($M_2$), ..., k($M_D$). These elements together with k(M) is presented to the Compare and Choose Module 114 which compares them and determines which of the $M_i$ for i=1, 2, ..., D is actually M. Thus, the message M has been transferred from A(lice) to B(ob).

Note that in this protocol, it is not necessary to compute canonical forms. All that is required is an algorithm to decide (Compare and Choose Module 114) if two elements of the set M are the same or not.

In a key transport protocol, the bandwidth is defined to be the number of bits publicly exchanged between the two parties (via the Communication Module: Transmit and Receive 62) in order to transmit one bit (shared secret). In this protocol, the bandwidth decreases as D increases, but at the expense of an increase in off line computations (Compare and Choose Module 114).

In a binary system such as for digital message transmissions, the input 112 may be arbitrarily selected to be one of two elements $M_1$ or $M_2$. The monoid action may be conducted on the single arbitrary selected element. If the output of the monoid action 113 matches the input k(M), then k(M) may be presumed to represent the selected element. If k(M) does not match the output of the monoid action 113, then M is presumes to be the non-selected element.

If our module U is a group G then the basic property of a group (that every element has a unique inverse) allows us to present a different key transport protocol. It is again assumed that two parties A(lice) and B(ob) have already participated in an algebraic key agreement protocol of the type described previously (for groups), so that both A and B are in possession of a common key k which is a word in the group G. It is not assumed that k is in canonical form.

Figure 12:
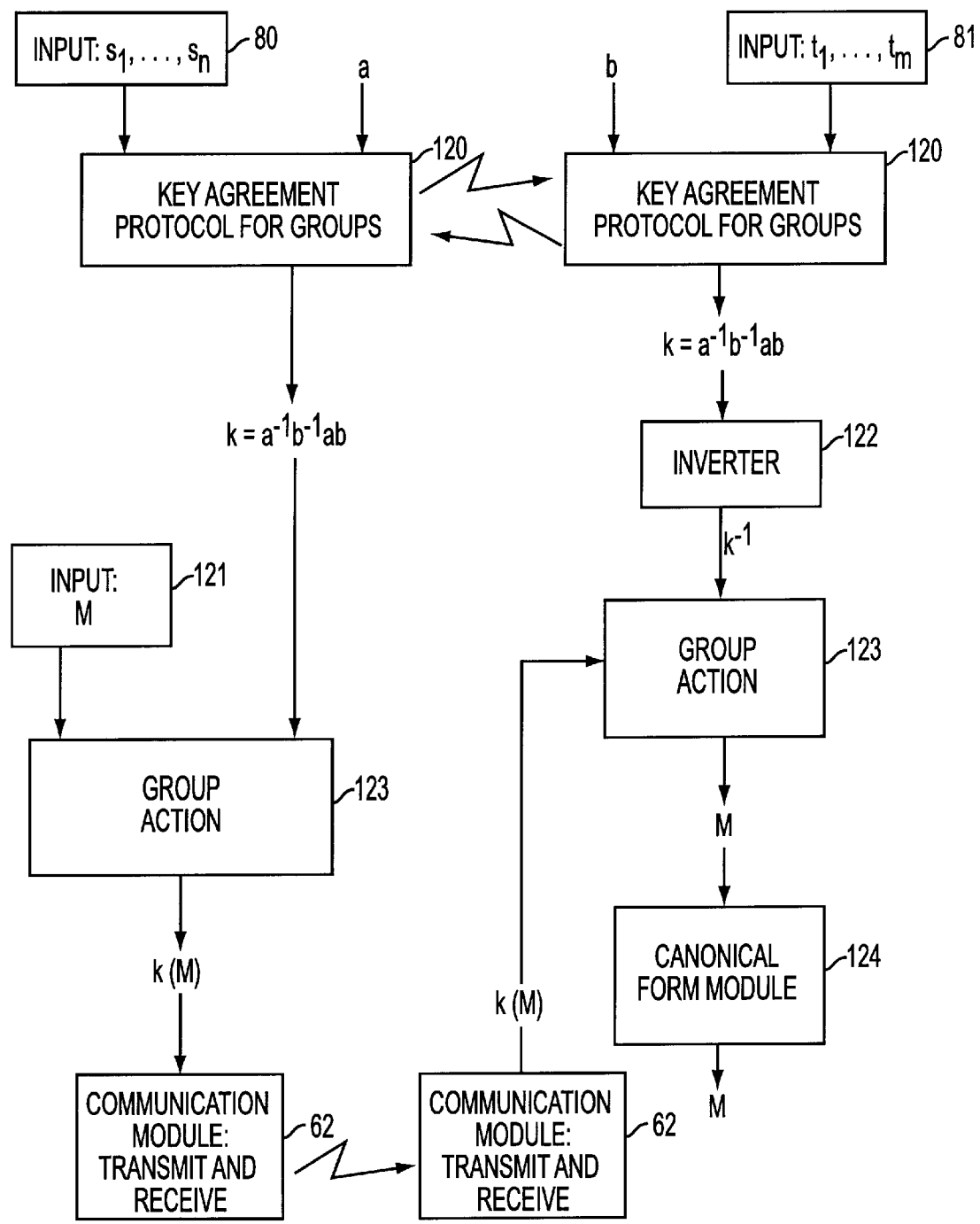
FIG. 12 shows a preferred embodiment of an apparatus which performs the algebraic key transport protocol for groups.

A preferred embodiment of an apparatus which performs the key transport protocol for groups is depicted in block diagrams in FIG. 12. Let k $\in$ G, be the common key exchanged via the Key Agreement Protocol for Groups 120 which was previously depicted in FIGS. 8 and 9. Let M $\in$ M be the Input 121. This is sent to the Group Action 123 which computes k(M) which is transmitted to B(ob) via the Communication Module: Transmit and Receive 62. Concurrently, the common key k which is the output of the Key Agreement Protocol for Groups 120 is sent to the Inverter 122 which inverts the element in the group to produce $k^{-1}$. The element $k^{-1}$ together with the received element k(M) is presented to the Group Action 123 which computes $k^{-1}(k(M))=M$. This is sent to the Canonical Form Module 124 which computes the canonical form is the message space M. Thus the message M has been transfrred from A to B.

Note that the above key tranaport protocol for groups will generally have low bandwidth (provided the bit-length of M is sufficiently large), but the algorithm for canonical forms (Canonical Form Module 123) will very often be much more computationally intensive than the comparison algorithms (Comparison Module 113).

Example 2

An example of a key transport protocol for monoids is given when the monoid U is the braid group with N generators (see Example 1), U=M, is the same as the message space, and the action is defined by $u(m)=u \cdot m$(braid multiplication) for all $u \in U, m \in M$.

Note that in this example inverses of elements are not required so that G is viewed as having only the structure of a monoid. A polynomial time algorithm for comparing words in the braid group is given in Patrick Dehornoy, "A fast method for comparing braids," Advances in Mathematics 125 (1997), pages 200–235 and also in Joan S. Birman, Ki Hyoung Ko, and Sang Jin Lee, "A new approach to the word and conjugacy problems in the braid groups," to appear in Advances in Mathematics.

With these choices, the key transport protocol is depicted in FIG. 11 and Dehorney's or the Birman-Ko-Lee algorithm can be used as a basis for the Compare and Choose Module 114.

Example 3

An example of a key transport protocol for groups is given when the group G is the braid group with N generators (see Example 1), G=M is the same as the message space, and the action is defined by braid group conjugation:

$g(m)=gmg^{-1}$, for all $g \in G, m \in M$.

A polynomial time algorithm for computing canonical forms in the braid group is given in Joan S. Birman, Ki Hyoung Ko, and Sang Jin Lee, "A new approach to the word and conjugacy problems in the braid groups," to appear in Advances in Mathematics.

With these choices, the key transport protocol is depicted in FIG. 12 and the Birman-Ko-Lee algorithm can be used as a basis for the Canonical Form Module 124.

Example 4

Another example of a key transport protocol for groups is given when G is the braid group with N generators (see Example 1), M is the free group generated by the set $\{a_1, \ldots, a_N\}$, and the action of G on M is given as follows (see Emil Artin, "Theorie der Zopfe," Hamb. Abh. 4 (1925), pages 47–72): for i=1, ..., N, $x_i(a_i)=a_{i+1}, x_i(a_{i+1})=a_{i+1}^{-1}a_ia_{i+1}$ $x_i(a_j)=a_j$ for $j=1, \ldots, i-1, i+2, \ldots, N$.

In this instance the algorithm for the canonical form module 124 is simply free reduction in the free group m, and the algorithm for group action 123 is generally exponential in the word length of the acting braid group element.

What is claimed is:

1. An asymmetric encryption system comprising:
   an asymmetric monoid key establishment apparatus responsive to a private element and a combined input monoid list which is not required to be confidential;
   a monoid action unit connected to said monoid key estabishment apparatus responsive to an input message and having an encrypted output.

2. An encryption system according to claim 1, wherein said monoid key establishment system is group based.

3. An encryption system according to claim 1, wherein said monoid key establishment apparatus is braid group based.

4. An encryption system according to claim 1, further comprising a comparison module referencing said encrypted output to an encrypted input.

5. An encryption system according to claim 2, wherein said monoid action unit is a group action unit.

6. An encryption system according to claim 3, wherein said monoid action unit is a braid group action unit.

7. An encryption system according to claim 5, wherein said monoid action unit further comprises a key inverter.

8. An encryption system according to claim 7, further comprising a canonical form modulator responsive to said encrypted output.

9. An encryption system according to claim 1, further comprising means for creating a set of input monoids.

10. An encryption system according to claim 9, wherein said means for creating a set of input monoids further comprises a monoid processor responsive to a pseudo random number generator.

11. An asymmetric key agreement system comprising:
    a combinatorial group modulator using a private element to act on a set of public elements associated with a remote system to generate a local combination;
    a combinatorial multiplier responsive to a multiplier input and a remotely generated combination wherein said multiplier input is related to said private element; and
    a key extractor responsive to said private element and an output of said combinatorial multiplier.

12. A key agreement system according to claim 11, further comprising:

a combinatorial means for generating a local group of elements; and a private element generator, wherein said private element is generated from one or more elements of said local group elements.

13. A key agreement system according to claim 11, wherein said combinatorial multiplier is a group multiplier.

14. A key agreement system according to claim 11, wherein said combinatorial group multiplier comprises:

a braid group conjugation module; and a rewriter connected to an output of said braid group conjugation module.

15. A key agreement system according to claim 14, wherein said rewriter is responsive to a pseudorandom number.

16. A key agreement system according to claim 14, wherein said combinatorial multiplier is a braid group multiplier.

17. An asymmetric encryption method comprising the steps of:

transforming a private element and a public combined input monoid list received over a channel not constrained to security into a monoid key wherein said transforming is based on the word problem for monoids;

combinatorially acting on said monoid key and an input message to create an encrypted output.

18. An encryption method according to claim 17, wherein said step of acting is based on group theory.

19. An encryption method according to claim 17, wherein said step of combinatorially acting is a monoid action.

20. An encryption method according to claim 19, further comprising the step of comparing said encrypted output to an encrypted input.

21. An encryption method according to claim 18, wherein said step of combinatorially acting is a group action based on the conjugacy problem.

22. An encryption method according to claim 16, wherein said step of combinatorially acting is a braid group action.

23. An encryption method according to claim 21, wherein said step of combinatorially acting further comprises a key inversion step.

24. An encryption method according to claim 23, further comprising the step of canonically reformatting said encrypted output.

25. An encryption method according to claim 17, further comprising the step of creating a set of input monoids.

26. An encryption method according to claim 25, wherein said step of creating a set of input monoids further comprises the step of processing pseudo random numbers into monoids.

27. An asymmetric method for establishing a key comprising the steps of:

transforming a private element and a group of elements associated with a remote system into a local combination based on a combinatorial relationship;

receiving a remotely generated combination over a channel not required to be secure;

combinatorially multiplying a multiplier input and said remotely generated combination wherein said multiplier input is related to said private element; and extracting a key from said private element and the result of the step of combinatorially multiplying.

28. A method according to claim 27, wherein said step of combinatorially multiplying further comprises the step of rewriting the result responsive to a pseudorandom input.

29. A method for establishing a key according to claim 27, further comprising:

a step of generating a local group of elements; and a step of generating the private element, wherein said private element is generated from one or more elements of said local group elements.

30. A method for establishing a key according to claim 27, wherein said step of combinatorially multiplying is a group multiplication.

31. A method for establishing a key according to claim 27, wherein said step of transforming comprises the steps of:

conjugating a combination based on a combinatorial relation by said private element; and rewriting, responsive to a pseudorandom process, the result of the step of conjugating.

32. A method for establishing a key according to claim 31, wherein said step of combinatorially multiplying is a braid group multiplication.

33. A method for establishing a key according to claim 31, wherein the step of conjugating is a braid group conjugation.

* * * * *